(12) United States Patent
Cohen

(10) Patent No.: US 10,368,406 B2
(45) Date of Patent: Jul. 30, 2019

(54) FEED FORWARD CONTROLLED VOLTAGE TO CURRENT SOURCE FOR LED DRIVER

(71) Applicant: Texas Instruments Incorporated, Dallas, TX (US)

(72) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/416,936

(22) Filed: Jan. 26, 2017

(65) Prior Publication Data

US 2017/0142789 A1    May 18, 2017

Related U.S. Application Data

(62) Division of application No. 13/597,000, filed on Aug. 28, 2012.

(60) Provisional application No. 61/528,619, filed on Aug. 29, 2011, provisional application No. 61/670,002, filed on Jul. 10, 2012, provisional application No. 61/546,155, filed on Oct. 12, 2011, provisional application No. 61/546,159, filed on Oct. 12, 2011.

(51) Int. Cl.
| | |
|---|---|
| *H05B 33/08* | (2006.01) |
| *G05F 1/46* | (2006.01) |
| *H05B 37/02* | (2006.01) |
| *H02M 7/44* | (2006.01) |
| *H02M 1/42* | (2007.01) |
| *H02M 3/156* | (2006.01) |
| *H02M 1/08* | (2006.01) |
| *H02M 1/44* | (2007.01) |
| *H02M 3/04* | (2006.01) |
| *H02M 7/04* | (2006.01) |
| *H02M 1/00* | (2006.01) |

(52) U.S. Cl.
CPC ......... *H05B 33/0815* (2013.01); *G05F 1/468* (2013.01); *H02M 1/08* (2013.01); *H02M 1/4225* (2013.01); *H02M 1/44* (2013.01); *H02M 3/04* (2013.01); *H02M 3/156* (2013.01); *H02M 7/04* (2013.01); *H02M 7/44* (2013.01); *H05B 33/0824* (2013.01); *H05B 37/02* (2013.01); *H02M 2001/0009* (2013.01); *Y02B 20/347* (2013.01); *Y02B 70/126* (2013.01)

(58) Field of Classification Search
CPC . H05B 33/0815; H05B 33/0824; H02M 1/08; H02M 3/156
See application file for complete search history.

(56) References Cited

U.S. PATENT DOCUMENTS

| | | |
|---|---|---|
| 3,470,428 A | 9/1969 | Gill et al. |
| 4,295,079 A | 10/1981 | Otsuka et al. |
| 4,424,557 A | 1/1984 | Steigerwald |
| 4,710,683 A | 12/1987 | Bahn et al. |
| 4,745,352 A | 5/1988 | McGuire |

(Continued)

FOREIGN PATENT DOCUMENTS

WO    WO2007060129 A2    5/2007

*Primary Examiner* — Douglas W Owens
*Assistant Examiner* — Pedro C Fernandez
(74) *Attorney, Agent, or Firm* — Tuenlap Chan; Charles A. Brill; Frank D. Cimino

(57) ABSTRACT

A DC to DC converter receives a DC input voltage and generates an output DC voltage. A current sensor measures a DC input current. A control circuit is coupled to the current sensor for controlling the DC to DC converter to have a constant DC input current.

17 Claims, 11 Drawing Sheets

(56) References Cited

U.S. PATENT DOCUMENTS

| | | |
|---|---|---|
| 5,134,307 A | 7/1992 | Nakano |
| 5,917,711 A * | 6/1999 | Shikata ............ H02M 3/33569 363/16 |
| 6,232,726 B1 | 5/2001 | Janczak |
| 6,300,878 B1 | 10/2001 | Galloway et al. |
| 6,853,150 B2 | 2/2005 | Clauberg et al. |
| 2004/0046683 A1 | 3/2004 | Mitamura et al. |
| 2005/0162098 A1 | 7/2005 | Ball |
| 2006/0170378 A1 | 8/2006 | Lyle, Jr. et al. |
| 2008/0061708 A1 | 3/2008 | Wi et al. |
| 2008/0088255 A1 | 4/2008 | Wang et al. |
| 2008/0150436 A1 | 6/2008 | Suzuki |
| 2010/0052568 A1 | 3/2010 | Cohen |
| 2010/0302811 A1 * | 12/2010 | Saint-Pierre .......... H02M 1/425 363/21.01 |
| 2010/0309699 A1 | 12/2010 | Nishikawa |

* cited by examiner

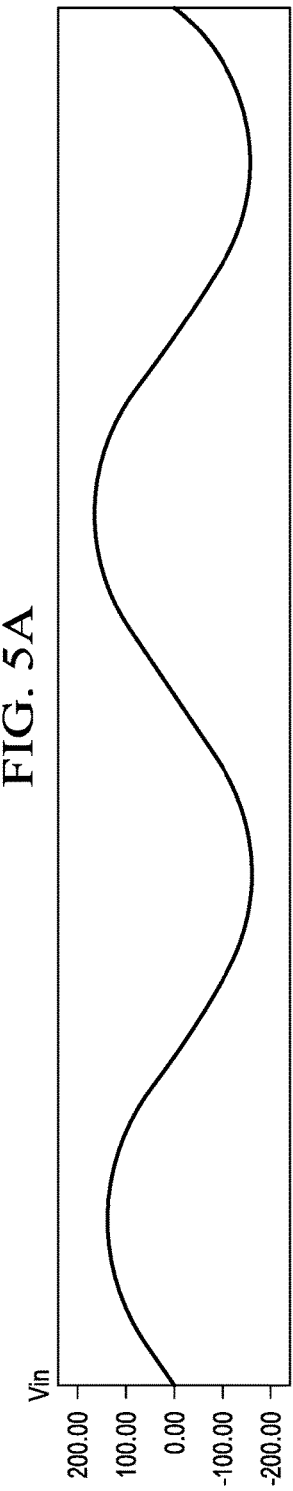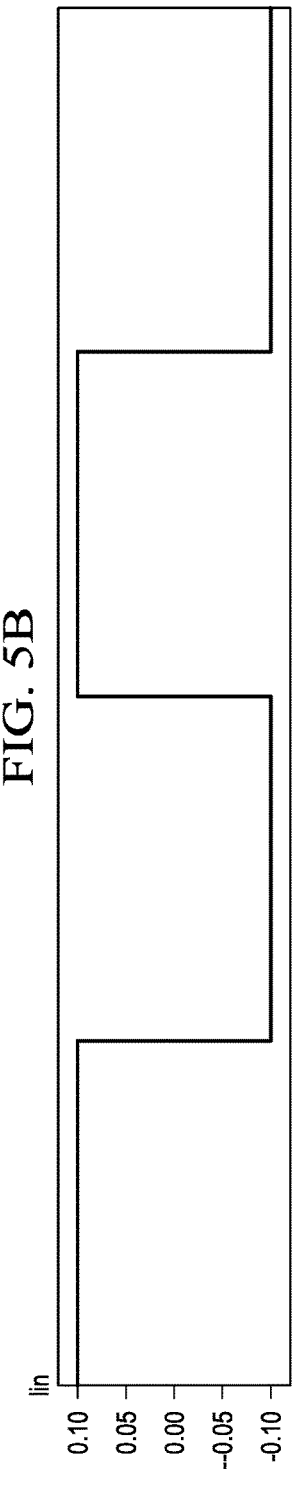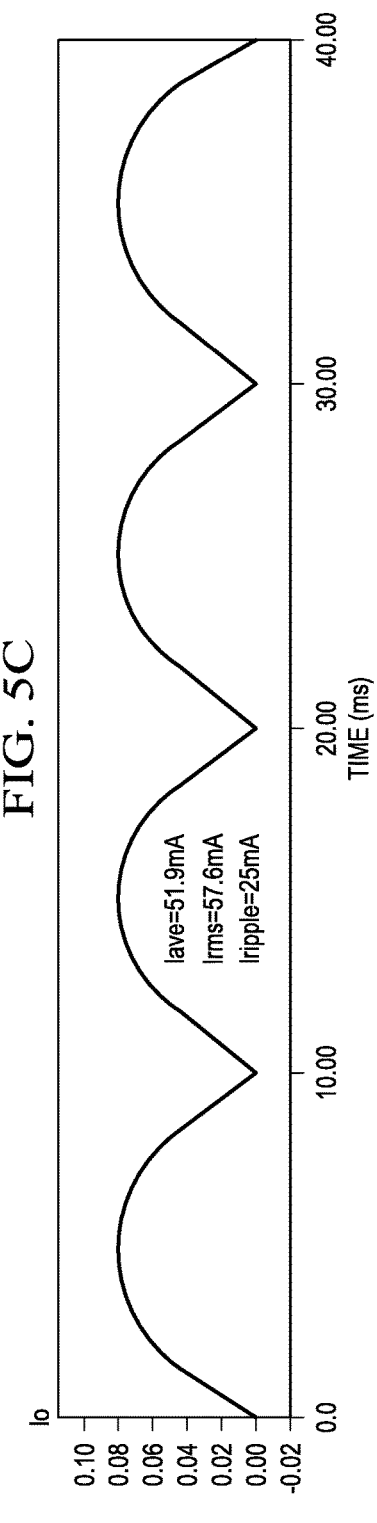

FEED FORWARD CONTROLLED VOLTAGE TO CURRENT SOURCE FOR LED DRIVER

CROSS REFERENCE TO RELATED APPLICATIONS

This patent application is a divisional of U.S. Nonprovisional patent application Ser. No. 13/597,000, filed on Aug. 28, 2012, which claims priority from U.S. Provisional Application No. 61/528,619, filed Aug. 29, 2011, U.S. Provisional Application No. 61/670,002, titled "LED Driver," filed Jul. 10, 2012, U.S. Provisional Application No. 61/546,155, titled "Phase Control Dimmable, PF Corrected LED Driver with Low Output Ripple Current," filed Oct. 12, 2011 and U.S. Provisional Application No. 61/546,159, titled "LED Drivers With Constant Line Current," filed Oct. 12, 2011, which are incorporated herein by reference in their entirety.

FIELD OF THE INVENTION

The invention relates to a voltage to current converter having a constant input current and more specifically to a voltage to current converter having a constant input current for driving an LED.

BACKGROUND OF THE INVENTION

LEDs have become the technology of choice for lighting products due to their high efficiency, low cost, compact size, rugged design and very long life. Unlike more conventional lighting technology, such as incandescent bulbs, fluorescent tubes and compact fluorescent lamps (CFLs), LEDs are current driven devices. Their light output is specified at a current through the LED 112. The voltage drop across an LED or LED string may vary from batch to batch by as much as 15 percent. Accordingly, it is common to drive an LED or LED string from a constant current circuit. A well-known circuit for this purpose is shown in FIG. 1, generally as 100. An input voltage is provided from an AC source 104 to a full wave rectifier 106. The output of the rectifier 106 is a DC voltage which is provided to a DC to DC converter 108 of an LED driver 102. An LED or LED string 112 is the load on the converter 108. A current sensor 114 is placed in series with the LED 112 to measure the current passing through the LED. The output of the current sensor 114 is applied to the inverting input of an error amplifier 116. The noninverting input of the amplifier 116 is connected to a current reference, such as voltage source 118. The output of the error amplifier 116 is coupled to a modulator 110, the output of which is coupled to the control input of the converter 108. Modulator 110 controls the operation of the converter 108 so that a predetermined current always flows through the LED 112 to produce a premeasured light output. The advantage of this circuit is an excellent line and load regulation of the output current. However, the circuit suffers from disadvantages, including poor power factor when operated from an AC input, a negative resistance input which is prone to oscillations in the presence of EMI filters, and poor compatibility with phase controlled dimmers. Phase controlled dimmers operate by clipping a portion of the AC waveform. As the voltage applied to the LED is reduced, the circuit attempts to maintain the current through the LED constant, thus interfering with the dimming. It is known to measure the angle of conduction, read the angle, and convert the value to change the current in the loop. This involves relatively complex circuitry.

A common problem in lighting is the variation in light intensity caused by voltage changes. For example, incandescent light bulbs suffer from a disadvantage that their light output varies widely when their operating voltage changes. This is because the power delivered to the bulb varies with the square of the operating voltage: if the operating voltage changes by 10 percent, the power delivered to the bulb changes by 21 percent. Furthermore, as the power to the bulb is diminished, the filament runs cooler—thus shifting more of the light into the invisible infrared spectrum (and vice-versa). This further exacerbates the flicker problem.

Therefore, there is a need for a simple and efficient device for driving an LED which at the same time minimizes the flicker problem.

SUMMARY OF THE INVENTION

It is a general object of the invention to provide for efficiently driving an LED and minimizing the dimming problem.

An aspect of the invention a DC to DC converter receiving DC input voltage and generating an output DC voltage, comprises a current sensor for measuring DC input current; and a control circuit coupled to the current sensor for controlling the DC to DC converter to have a constant DC input current.

Another aspect of the invention includes a method of driving an LED comprising: measuring and input current to it LED driver circuit. Controlling the driver circuit so that output current to drive the LED is proportional to input voltage.

Another aspect of the invention includes a voltage to current converter receiving a DC input voltage comprising: a current sensor for measuring DC input current; means for generating an absolute value of a sinusoidal reference voltage. Means for multiplying a value related to an output voltage of the converter by the absolute value of the sinusoidal reference voltage to generate a first reference voltage. Means for comparing an output of the current sensor with the first reference voltage to generate an error signal; and modulation means responsive to the error signal for operating the converter in order to maintain a constant input current whereby an output current of the converter driving an LED load is proportional to the DC input voltage.

Another aspect of the invention includes a converter circuit comprising a controlled DC current source in series between an output of the converter and a load output. An error amplifier coupled across the controlled DC current source to sense the output voltage of the converter or the voltage across the controlled DC current source and having an output coupled to a control input of the controlled DC current source; wherein the error amplifier controls the controlled DC current source so the average voltage drop across the controlled DC current source is regulated to the lowest value that will allow the controlled DC current source to deliver an essentially DC current to the load, whereby an essentially ripple-free current is delivered to the load.

A further aspect of the invention includes a converter circuit comprising a capacitor coupled across an output of the converter. A controlled DC current source coupled between the converter output and a load output. An error amplifier having an inverting input coupled to one terminal of the capacitor and a noninverting input coupled to another terminal of the capacitor and an output coupled to a control input of the controlled DC current source, wherein the error amplifier controls the average voltage across the capacitor so that it is constant.

BRIEF DESCRIPTION OF DRAWINGS

Further aspects of the invention will appear from the appending claims and from the following detailed description given with reference to the appending drawings.

Further aspects of the invention will appear from the appending claims and from the following detailed description given with reference to the appending drawings.

FIGS. 5A through 5C show the waveforms for the circuit of FIG. 3;

DETAILED DESCRIPTION OF EXAMPLE EMBODIMENTS

Figure 1:
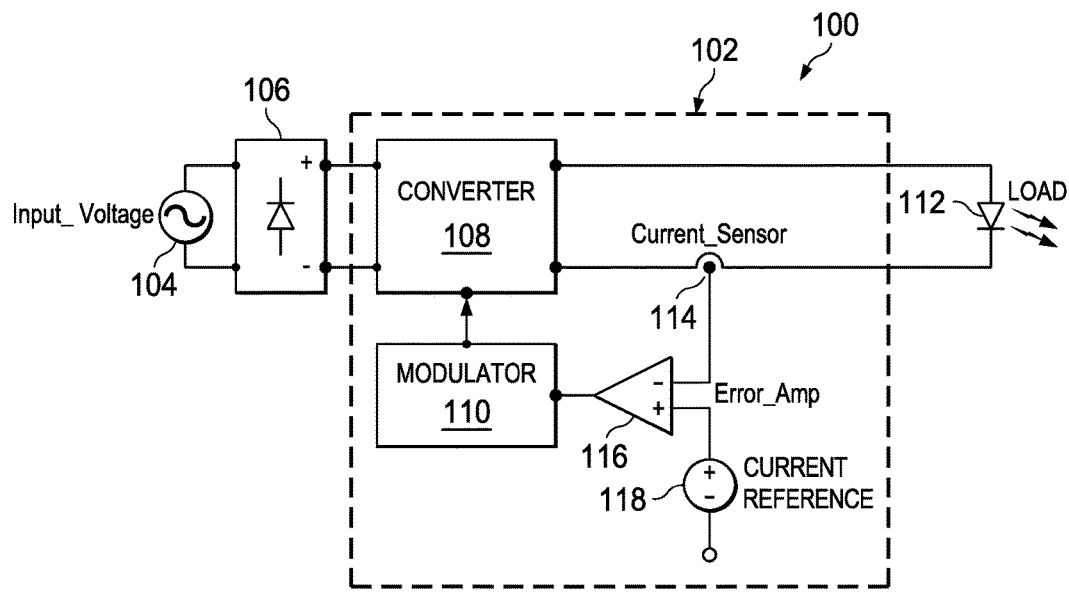
FIG. 1 is a block diagram of a prior art LED driver circuit.
Figure 2:
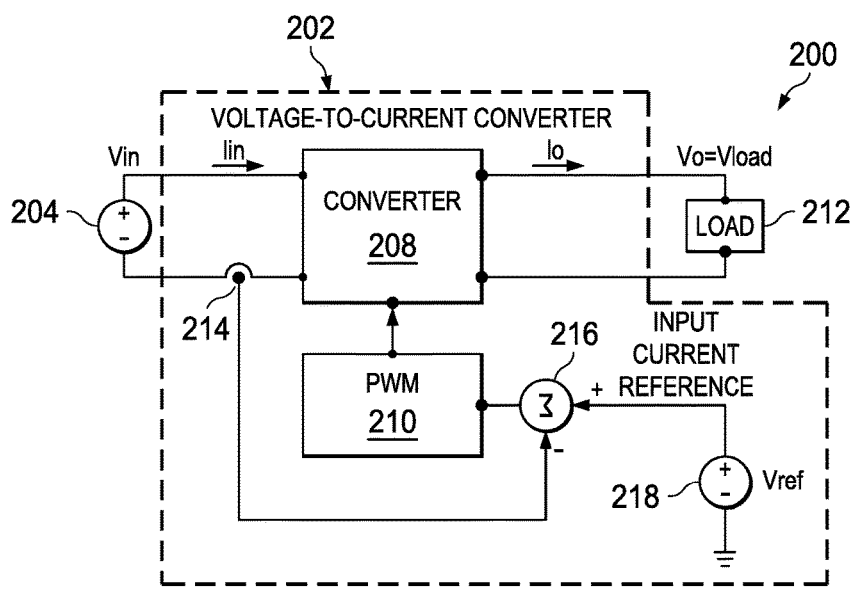
FIG. 2 is a block diagram of an LED driver circuit according to the present invention.

An aspect of the present invention is shown generally in FIG. 2 as 200. In FIG. 2, a DC input 204 is shown instead of the AC input 104, shown in FIG. 1. The DC input can be an AC source coupled to a DC rectifier, such as a full wave rectifier 106, shown in FIG. 1, for example. The DC input voltage 204 is applied to a DC to DC converter 208 of LED driver circuit 200. The converter can utilize any converter topology, including isolated and nonisolated converters, and any control algorithm for controlling the input current. A current sensor 214 is placed in series between the negative input to the converter and the negative output of the power source. The output of converter 208 is connected to a load 212, which may be an LED or LED string, for example. The load could also be a DC to AC converter operating an AC load, such as a flourescent tube, for example. The converter may be controlled by a pulse width modulation (PWM) modulator circuit 210 which receives the output of an error amplifier 216, here shown as a summing point. The summing point 216 receives at its noninverting input an current reference, here a DC voltage reference 218. The output of the current sensor 214 is applied to the inverting input of error amplifier 216. The input/output power balance, assuming near 100 percent efficiency, will cause the LED string current to be:

$$Po = Pin = Vin \cdot Iin = Vin \cdot K_1 \cdot Vref \qquad \text{Equation 1}$$

Where Po=output power
Pin=input power

Vin=input voltage
Iin=input current
$K_1$=constant
Vref=reference voltage

Solving for the output current Io:

$$Io = \frac{Po}{Vo} = \frac{Vin \cdot K_1 \cdot Vref}{Vo} \qquad \text{Equation 2}$$

Where Io=output current
Vo=output voltage

Here the LED current is proportional to the input voltage and inversely proportional to the LED string voltage. By giving up control of driving the LEDs with a constant current, they are driven with a current that is proportional to the input voltage. Although such circuit will be effected by changes in the input voltage, such as caused by plugging in a high current draw application, the effect will only be of the first order, instead of more than the second order, as was an incandescent lamp. The circuit will not fight reducing the input voltage to dim the LED and all the LEDs and a fixture will dim together.

Figure 3:
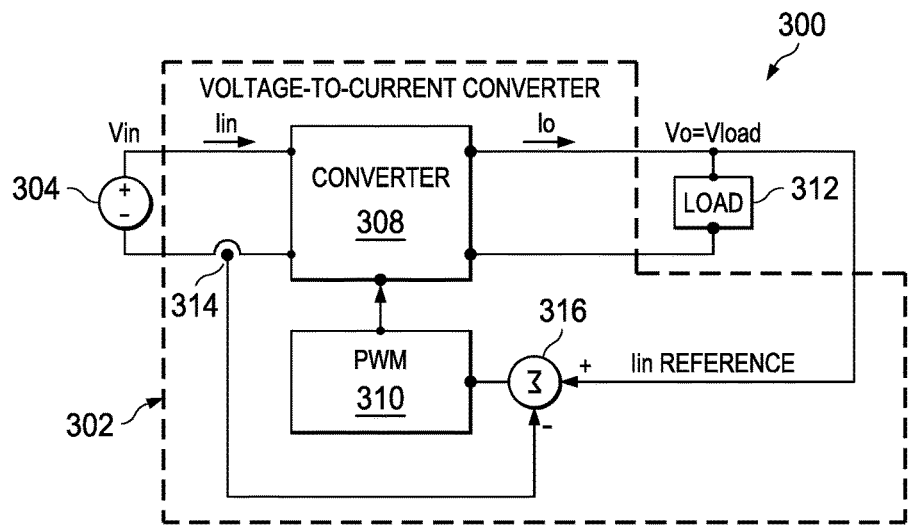
FIG. 3 is a block diagram of a second embodiment of the present invention.

FIG. 3 shows another aspect of the present invention, generally as 300. As with the circuit in FIG. 2, the circuit is powered by a DC source 304 coupled to the input of a DC to DC converter 308 of a voltage to current converter 302. The DC input voltage from source 304 may be the rectified voltage of an AC source such as the source 104 shown in FIG. 1. A current sensor 314 in series with the voltage source and the input to a converter 308. The converter 308 may be operated under the control of a pulse width modulation (PWM) circuit 310 which modulates the converter in order to maintain a constant input currrent to the converter, as shown in FIG. 2. The input of the pulse width modulator 310 is connected to an error amplifier, indicated as a summing point 316. The inverting input of the error amplifier 316 is connected to the output of the current sensor 314. A load 312 placed across the output terminals of the converter 308, receives an output current Io. The load may be a LED or string of LEDs, for example. The load 312 could also be a DC to AC converter operating an AC load, such as a flourescent tube, for example. The main difference between the embodiment shown in FIG. 2 and that shown in FIG. 3, is that there is no input 218 in the circuit shown in FIG. 3. Instead, the output voltage, or a portion of the output voltage, is shown as applied to the noninverting input of error amplifier 316.

Making the input current proportional to the LED string voltage causes the LED string current to become independent of the string voltage. The power delivered to the LED string is:

$$Po = Pin = Vin \cdot Iin = Vin \cdot K_2 \cdot Vo \qquad \text{Equation 3}$$

Where $K_2$=constant
Solving for the output current:

$$Io = \frac{Po}{Vo} = \frac{Vin \cdot K_1 \cdot Vo}{Vo} = K_2 \cdot Vin \qquad \text{Equation 4}$$

Thus, the LED string current is proportional to the input voltage and fully regulated against variation in the string voltage, resulting in a significantly better light stability than that of an incandescent source.

LEDs are measured to determine their light output at a predetermined current. Then they are binned according to their light output at the predetermined current. Therefore, one trying to build a light fixture would choose strings from the same bin, so that the light outputs from each string would be the same. The light output of LED string may vary as much as 15 percent from batch to batch. Thus, the converter circuit must adjust its output voltage to the voltage drop across the string at the specified current.

Figure 4:
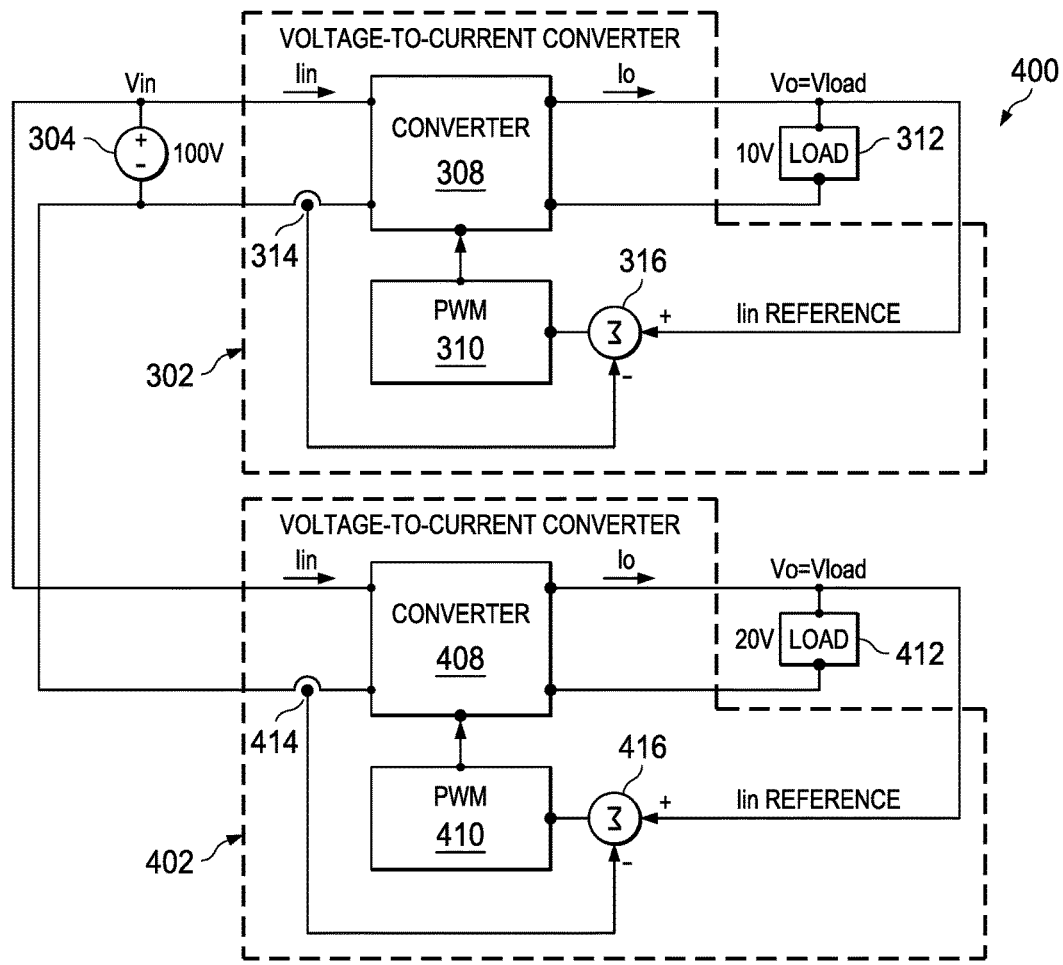
FIG. 4 is a block diagram showing 2 of the circuits of FIG. 3 for explanatory purposes.

In order to explain how the present invention automatically compensates for differences in the voltage drop across the LED string, two of the circuits 300 of the present invention have been illustrated generally as 400 in FIG. 4. This should replicate the situation in a lighting fixture comprising two strings of LEDs, for example. The first voltage converter 302 corresponds to the voltage to current converter shown in FIG. 3. It has a DC to DC converter 308 coupled to receive the voltage 304 and has a current sensor 314 in series with the voltage source 304, the load 312 is a LED string, which for the present example, has a voltage drop of 10 V across the string. A portion of the output voltage of the converter 308 is connected to the noninverting input of error amplifier 316. The inverting input of error amplifier 316 receives the output of current sensor 314. The output of the error amplifier 316 controls a pulse width modulation circuit 310, which in turn modulates the converter maintain a constant input current to the converter 308.

A second voltage to current converter 402 is essentially identical to the voltage to current converter 302. It has a DC to DC converter 408 the output voltage of which is connected to the noninverting input of error amplifier 416. A load 412, here a string of LEDs having a 20 V drop across the string, is connected to the output of the converter. The input of the converter 408 is connected to the same voltage source 304 for the converter 308. This could be the situation in a lighting fixture, for example. A current sensor 414 is in series with the parallel of connection of the voltage 304 to the converter 408. The output of the current sensor 414 is connected to the inverting input of error amplifier 416. The output of error amplifier 416 is connected to a pulse width modulation circuit 410 which modulates the converter 408 so that the input current to the converter is always constant.

It should be noted that the voltage difference between the two LED strings 312, 412 is intentionally exaggerated both to clarify the explanation of the principle behind the present invention and to show its versatility. In addition, it should be noted that, for the following analysis, the converters will be assumed to be 100 percent efficient. In fact, converters utilized in this situation are of very high efficiency, close to 100 percent, and close enough to be considered 100 percent for this explanation. Those skilled in the art would recognize that since the converters 308, 408, are identical, if the actual conversion efficiencies were utilized in the following analysis, the results of the analysis would be the same.

For the purposes of explanation, we have assumed that the input voltage is 100 V. We also assume that the first converter 302 is configured so that it will regulate the input current to 1 A. The resulting input power is:

$$P=VI=100 \cdot 1=100 \ W$$

The converter 402 is configured the same as the converter 302. However, the voltage drop across the LED load is 20 V, instead of 10 V. Because the input current is proportional to the output voltage, the input current will be twice that of the converter 302, or 2 A. The input power to converter 408 would thus be:

$$P=IV=100 \cdot 2=200 \ W$$

The output current through LED string 312 equals the 100 W input divided by the 10 V drop across LED string 312. Thus, the output current through the LED string will be 10 A. In the second converter 402, the output current is 200 W power input divided by the 20 V drop across LED string 412, which equals 10 A. Thus, although there is a 2 to 1 difference in the voltage drop across the LED strings to produce the identical amount of light, both strings operate at the same current to yield the same light output. Thus, the circuit can easily handle a 15 percent normal variation in LEDs from batch to batch. If the actual efficiencies of the converters 308, 408 were utilized, the output currents will be slightly different, but the currents through both LED strings 312, 412 would still be identical.

FIGS. 5A through 5C show the waveforms for a practical implementation of the circuit shown in FIG. 3. FIG. 5A shows the input voltage which is equal to 115 Vrms. The output voltage, is equal to 200 V, the output current is 51.9 mA. The circuit shows a power factor of 0.9. FIG. 5B shows the input current, which is a square wave and FIG. 5C shows the output current.

Figure 6:
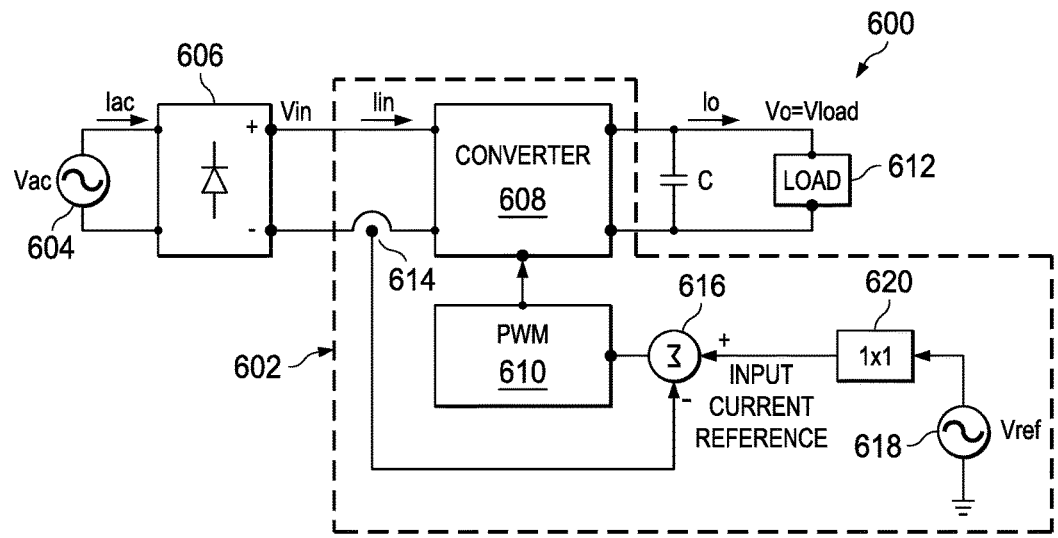
FIG. 6 is a block diagram of another embodiment of the invention.

Another aspect of the invention is shown in FIG. 6, generally as 600. The circuit of FIG. 6 is similar to the previous embodiment shown in FIG. 2, except that an AC input is utilized. AC voltage source 604 is connected to the input of a full wave bridge rectifier 606, the output of which is connected to DC to DC converter 608 of voltage to current converter 602. A current sensor 614 is a series between the bridge rectifier 606 and the converter 608. The output is connected to a load 612, which may be a string of LEDs, for example. The load 612 could also be a DC to AC converter operating an AC load, such as a flourescent tube, for example. A capacitor C is coupled across the output of the converter. The converter may be modulated by a pulse width modulation circuit 610 so that the current input to the converter is always the same. An error amplifier, here shown as summation point 616 is coupled to the input of pulse width modulation circuit 610. The inverting input of error amplifier 616 is coupled to the output of current sensor 614. The noninverting input that error amplifier 616, is coupled to input current reference 618, 620. In the example illustrated in FIG. 6, the input reference 618 is a sinusoidalal voltage Vref, which is an connected to an absolute value circuit 620. The output of absolute value circuit 620 is connected to the noninverting input of error amplifier 616. As shown in FIG. 5B, if the input current is a square wave, the power factor is 0.9. If the reference voltage Vref. 618 is a square wave at twice the line frequency starting a conduction angle of 26° and ending at a conduction angle of 180−26=154°, the power factor will be 0.968 with a TMD of 25−9 percent. Other waveforms with an essentially constant current during the truncated portion of the waveform could also be used. However, if Vref is the more difficult to generate sinusoidal waveform, the power factor will be 1.0. This is a significant improvement over the circuit shown in FIG. 3, for example.

Figure 7:
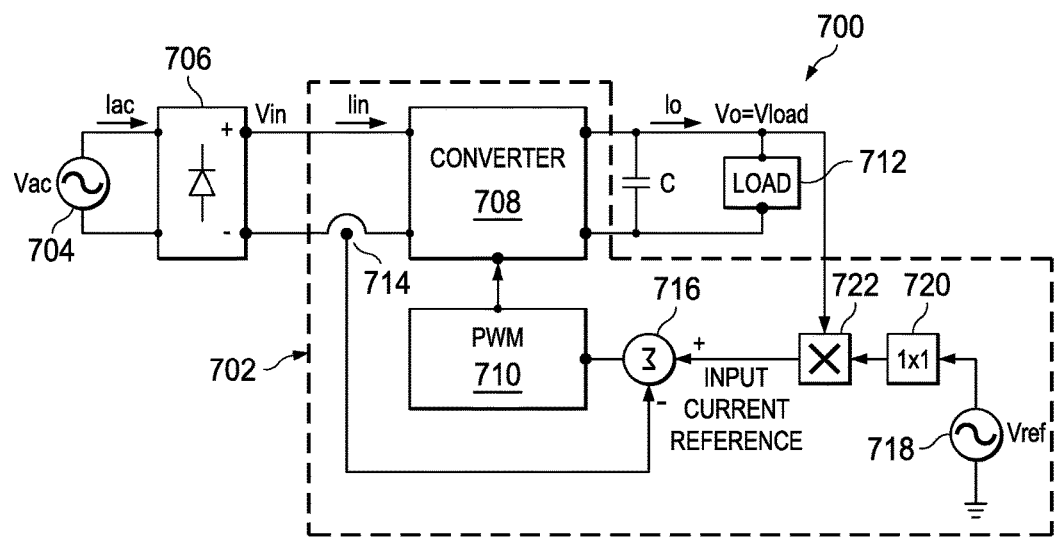
FIG. 7 is a block diagram of a, the present invention.

Another aspect of the present invention is shown in FIG. 7, generally as 700. The voltage to current converter circuit 702 is similar to that shown in FIG. 6. The AC voltage source 704 connected in series with a full wave bridge rectifier 706, the output of which is provided to DC to DC converter 708. A current sensor 714 is in series with the voltage supplied to the converter 708. A pulse width modulator 710 maybe used to modulate the converter 708 so that the input current is always the same. An error amplifier, here illustrated as summation point 716, is coupled to the input of pulse width modulation circuit 710. The output of current sensor 714 is connected to the inverting input of error amplifier 716. The noninverting input of error amplifier 716 is coupled to the output of multiplication circuit 722. Multiplication circuit 722 is coupled to the output of absolute value circuit 720 which takes the absolute value of the sinusoidal reference Vref 718. This value is then multiplied by a value related to the output voltage Vo across the load 712, which may be an LED string, for example. The load could also be a DC to AC converter operating an AC load, such as a flourescent tube, for example. A capacitor C is coupled across the load 712. The circuit combines the power factor advantage of the circuit in FIG. 6, with the advantage of the circuit shown in FIG. 3 in which the current through the LED string is independent of the voltage drop across the LED string.

Figure 8:
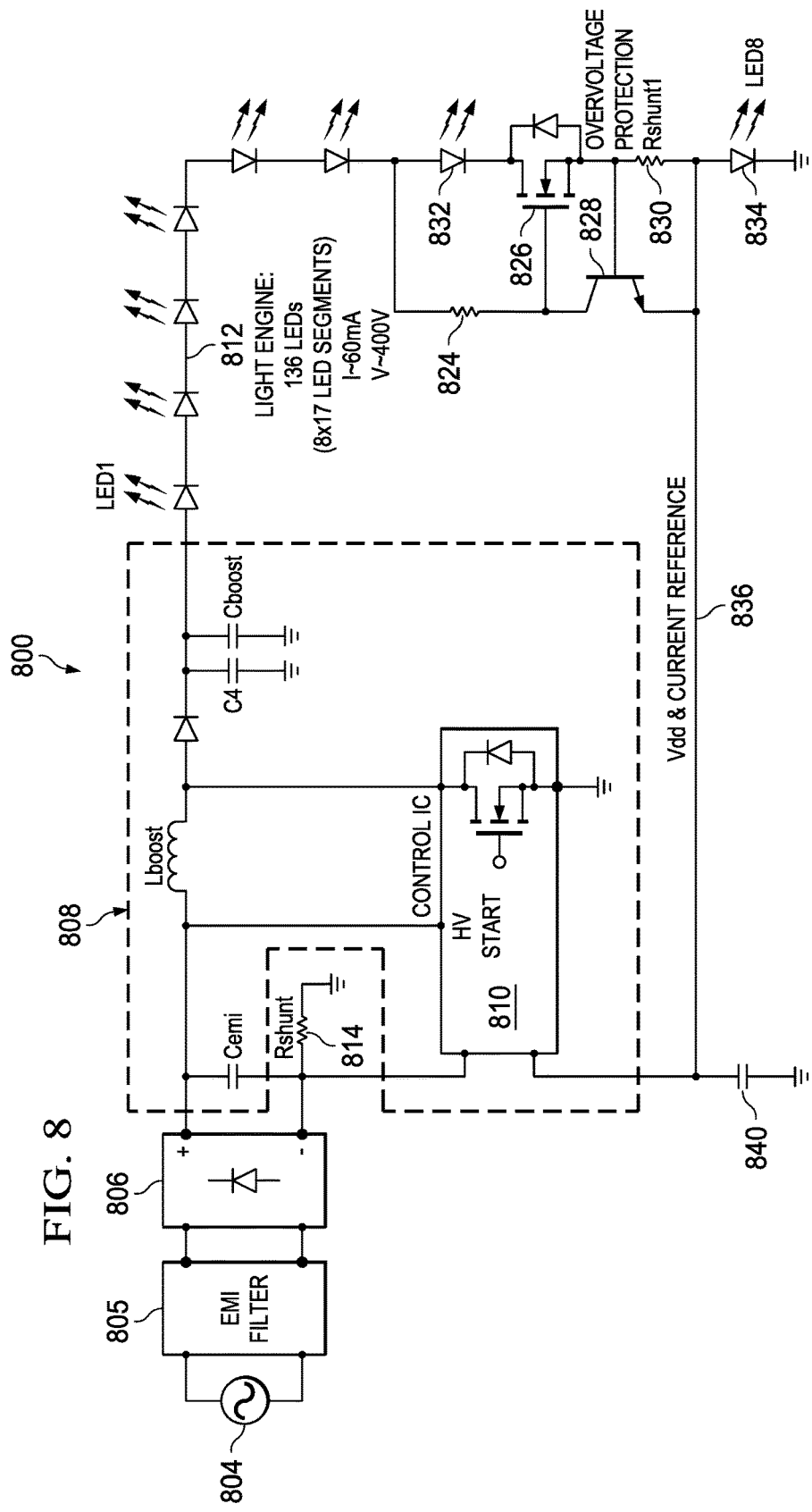
FIG. 8 is a schematic diagram of a practical embodiment of the circuit of FIG. 7.

FIG. 8 shows an implementation of the present invention in a practical circuit, generally as 800. AC voltage source 804 is coupled to an optional EMI filter 805 to a full wave bridge rectifier 806, the output of the full wave bridge rectifier 806 is coupled to a DC to DC converter 808, here a boost converter. A shunt 814 is used to measure the input current to the boost converter 808. Converter 808 is modulated by control circuit 810 to drive an LED light engine comprising 136 LEDs drawing approximately 60 mA of current at 400 V. In this embodiment, a boost converter was chosen. In the event that a voltage surge occurs at voltage source 804, boost converter 808 could not reduce the output voltage to protect the LED string. Thus, it is possible the output voltage will rise high enough to cause a failure of the LEDs Accordingly a circuit comprising resistor 824, NMOS transistor 826, NPN transistor 828, shunt resistor 830 and LEDs 832 and 834 is used as an overvoltage protection circuit. The resistor 824 is connected between the gate of NMOS transistor 826 and the junction of LED 832 and the LED preceding LED 832 in the string. Thus, NMOS transistor 826 is normally on. In the event that too much current flows through the LED string, enough voltage will be built up across shunt resistor 830 to turn on NPN transistor 828 between the gate of transistor 826 and the current reference 836. This will turn transistor 826 off preventing damage to the LED string.

Figure 9A:
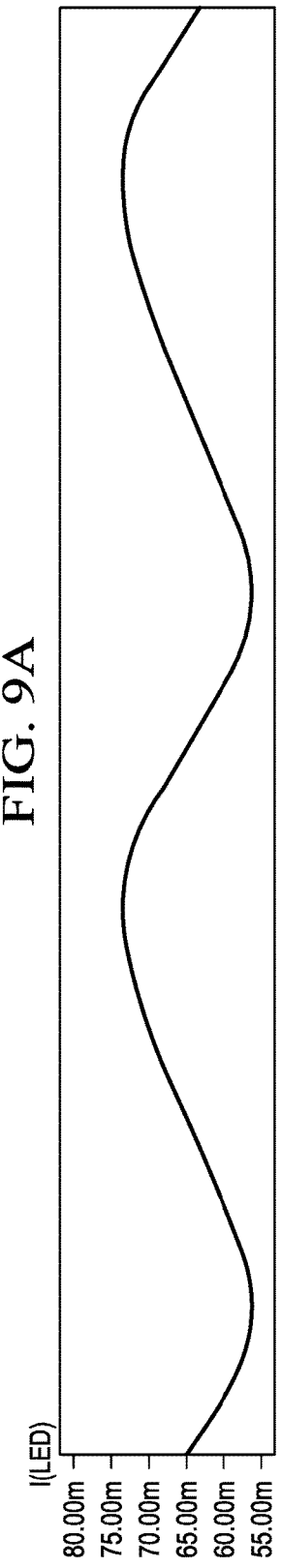
FIGS. 9A through 9F illustrate the waveforms for the circuit of FIG. 8.
Figure 9B:
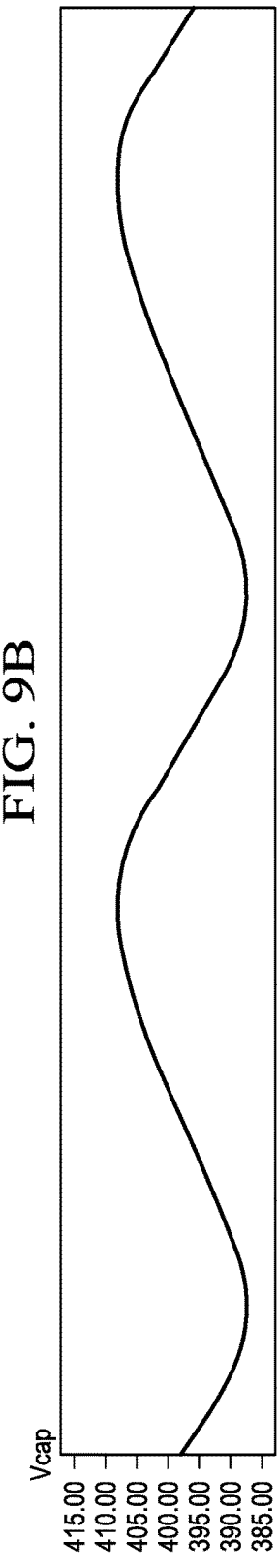
Figure 9C:
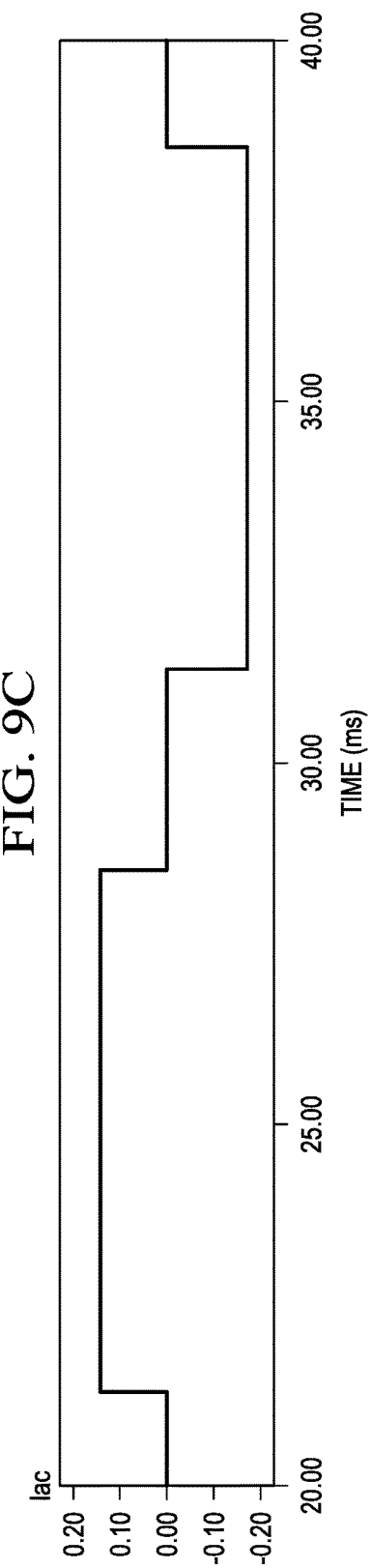
Figure 9D:
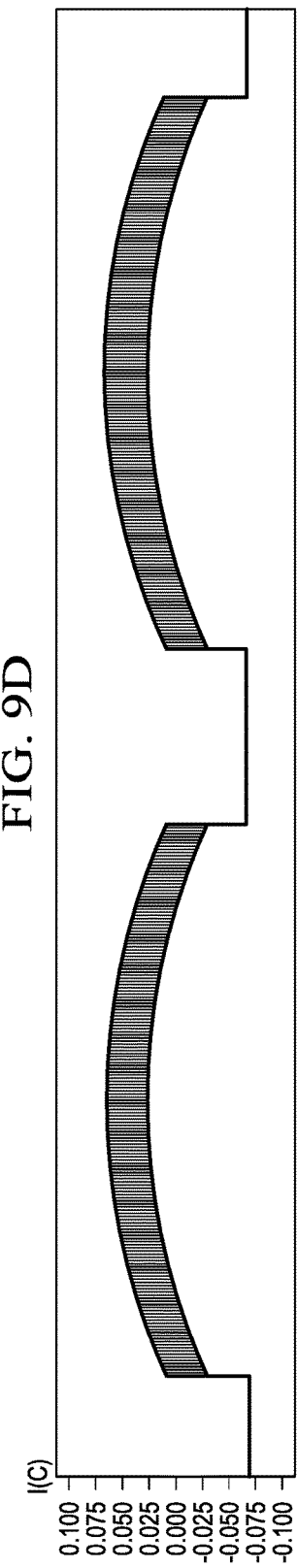
Figure 9E:
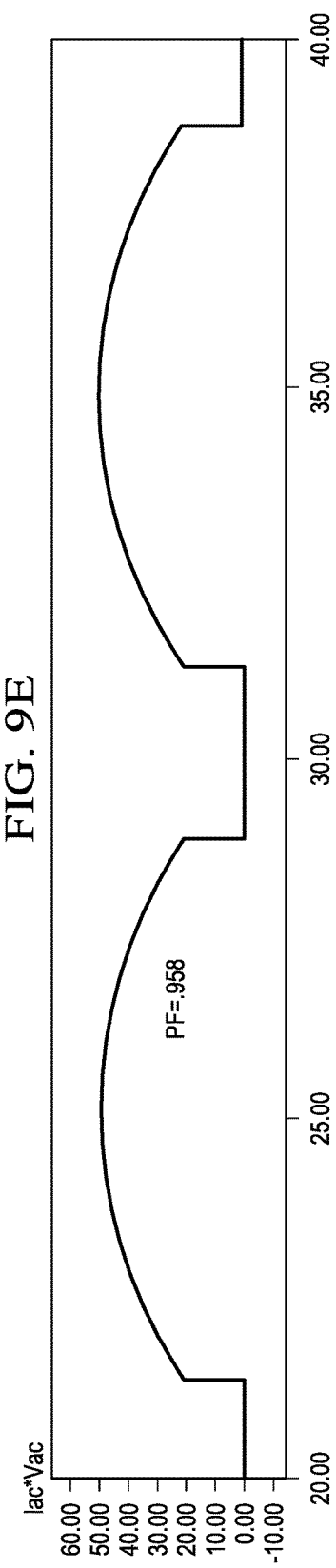
Figure 9F:
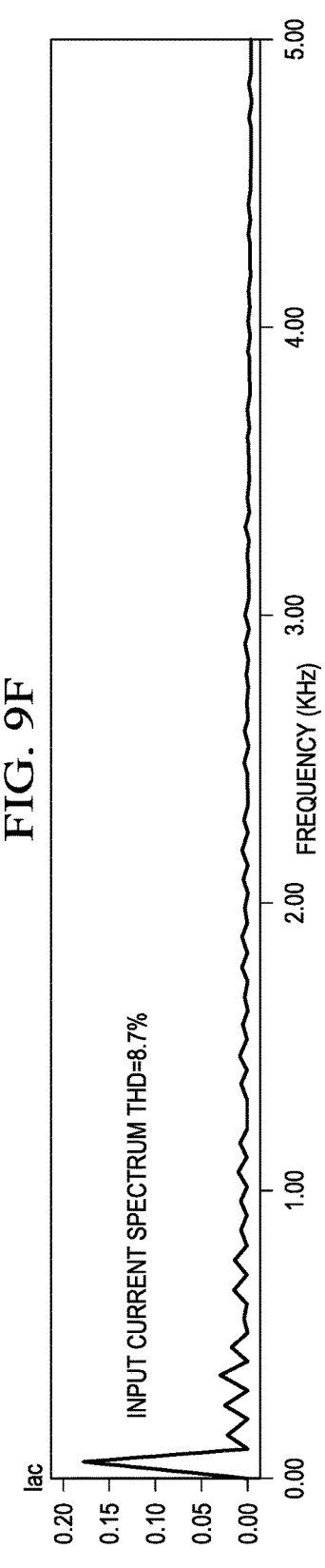

FIGS. 9A through 9F show the waveform of the circuit of FIG. 8. FIG. 9A shows the current through the LEDs. FIG. 9B shows the voltage across the capacitor C. FIG. 9C shows the input current. FIG. 9D shows the current in capacitor C. FIG. 9E shows the power factor with the circuit and FIG. 9F shows the input current spectrum showing a THD of 8.7 percent.

Because the input power varies with time, the output current of the basic driver contains a substantial amount of AC ripple, approximately 50% as shown in FIG. 5C. This is highly undesirable because light output of the LEDs will vary with the ripple, which can yield a stroboscopic effect. An output capacitor C, as shown in FIG. 6, for example, is placed across the output voltage in order to reduce the ripple. In order for the capacitor to filter out the ripple, it must have an impedance at twice the line frequency (100 or 120 Hz) that is less than the series resistance of the LEDs. This may require a large capacitor, which increases the size and cost of the driver. Furthermore, if the voltage across the capacitor is constant, all of the ripple will appear across the LEDs and not flow through the capacitor.

Figure 10:
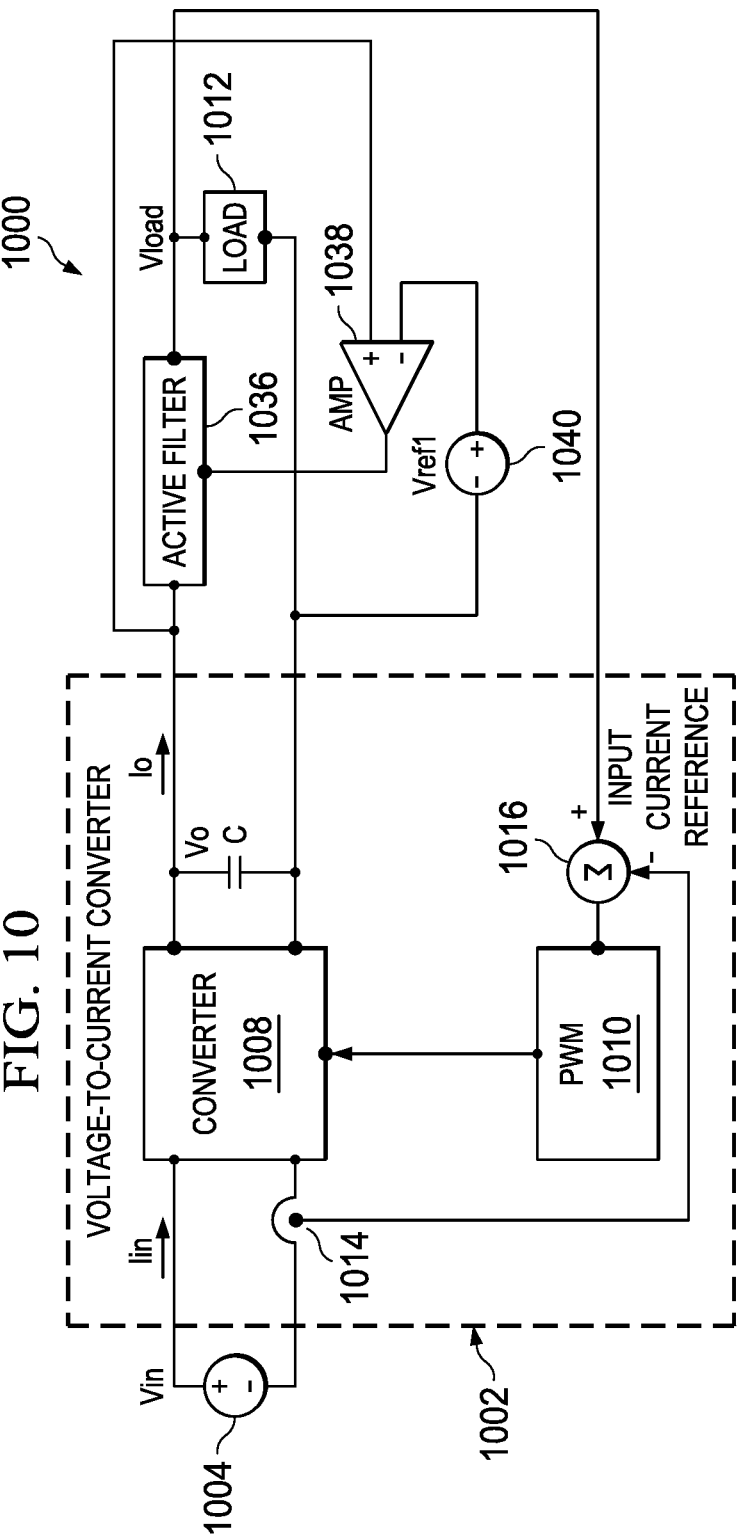
FIG. 10 is a block diagram of a further embodiment of the present invention.

A solution to this problem is shown in FIG. 10, generally as 1000. The circuit shown in FIG. 10 is similar to that shown in FIG. 3. A voltage source Vin 1004 is connected to the DC to DC converter 1008. A current sensor 1014 is series with the voltage input to the converter. A pulse width modulator circuit 1010 may be used to control the converter to maintain a constant input current. The pulse width modulation circuit 1010 receives the output of an error amplifier, here shown as summation point 1016, which receives the output of the current sensor 1014 at its inverting input. The noninverting input to error amplifier 1016 is the output voltage across the load 1012, which may be a string of LEDs, for example. The load 1012 could also be a DC to AC converter operating an AC load, such as a flourescent tube, for example. The load 1012 receives the output voltage of Vo to generate across capacitor C by converter 1008 and the load 1012. The controlled DC current source 1036 is placed in series between the output of converter 1008 and controlled DC current source 1036 is controlled by error amplifier 1038, which has its noninverting input connected to Vo prior to the controlled DC current source and its inverting input coupled to the load ground through a voltage reference Vref1. The error amplifier 1038 controls the average voltage across capacitor C so that it is constant. In order for the average voltage across capacitor C to be constant, current flowing to load 1012 must exactly equal the current output of the converter 1008. If this were not so, the voltage across the capacitor would increase if the current flowing to the load is less than the current output by the converter or decrease if the current flowing to the load is greater than the converter output. Therefore, the controlled DC current source delivers to the load an average current exactly equal to the average output current of the converter while substantially all the AC ripple current flows into the capacitor C. The optimum voltage for the reference Vref1 1040 is the voltage across the LEDs, plus approximately ½ of the peak to peak ripple voltage. The voltage across the LEDs must be the maximum voltage expected for the LED string. As described above, the voltage drop across LEDs varies from batch to batch. Therefore, in a manufacturing environment, the converter would have to be built so that the output voltage chosen for the voltage across the LEDs, when choosing Vref1, is the maximum expected from any batch. This creates a problem in that for all other LED strings, excess voltage will be generated which must be absorbed by the controlled DC current source.

Figure 11:
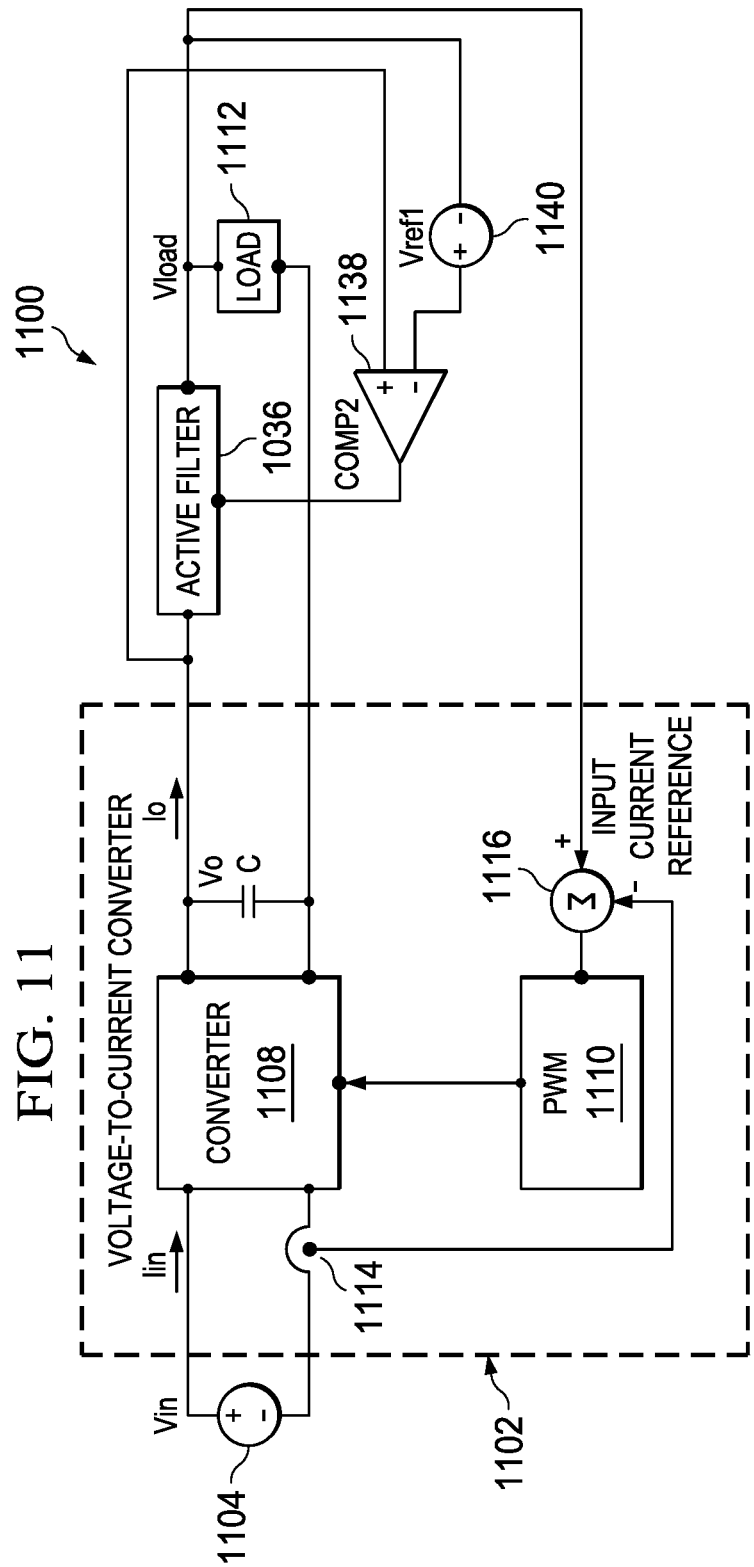
FIG. 11 is a block diagram of another embodiment of the present invention.

An improved solution is shown in FIG. 11, generally as 1100. This circuit is similar to the circuit shown in FIG. 10. A DC voltage source Vin 1104 is coupled to the input of converter 1108 with a current sensor 1114 connected in series between the voltage source and the converter. The converter is modulated by a pulse width modulation circuit 1110, which receives the output of error amplifier 1116, here shown as a summing point. The error amplifier 1116 receives the output of the current sensor 1114 at its inverting input. The error amplifier receives the output voltage across the load at its noninverting input. A load 1112, which may comprise a series string of LEDs, is placed across the output voltage Vo from converter 1108. The load_could also be a DC to AC converter operating an AC load, such as a flourescent tube, for example. A capacitor C is placed across the output voltage. Controlled DC current source 1036 is in series between the converter and the load. An error amplifier 1138 controls the controlled DC current source and receives at its noninverting input the voltage across the capacitor C. The inverting input of comparator 1138 is coupled to the output voltage across the load through a series reference Vref 1140, so instead of maintaining a constant average voltage across the capacitor C, this circuit configuration maintains a constant average voltage across the controlled DC current source 1036. Thus, the voltage across the controlled DC current source will absorb the ripple. The value of the reference voltage Vref1 is selected to assure that the controlled DC current source never saturates and is always able to absorb the ripple voltage. Therefore, the minumum voltage required to operate the load is always present and excessive voltage is not generated.

Figure 12:
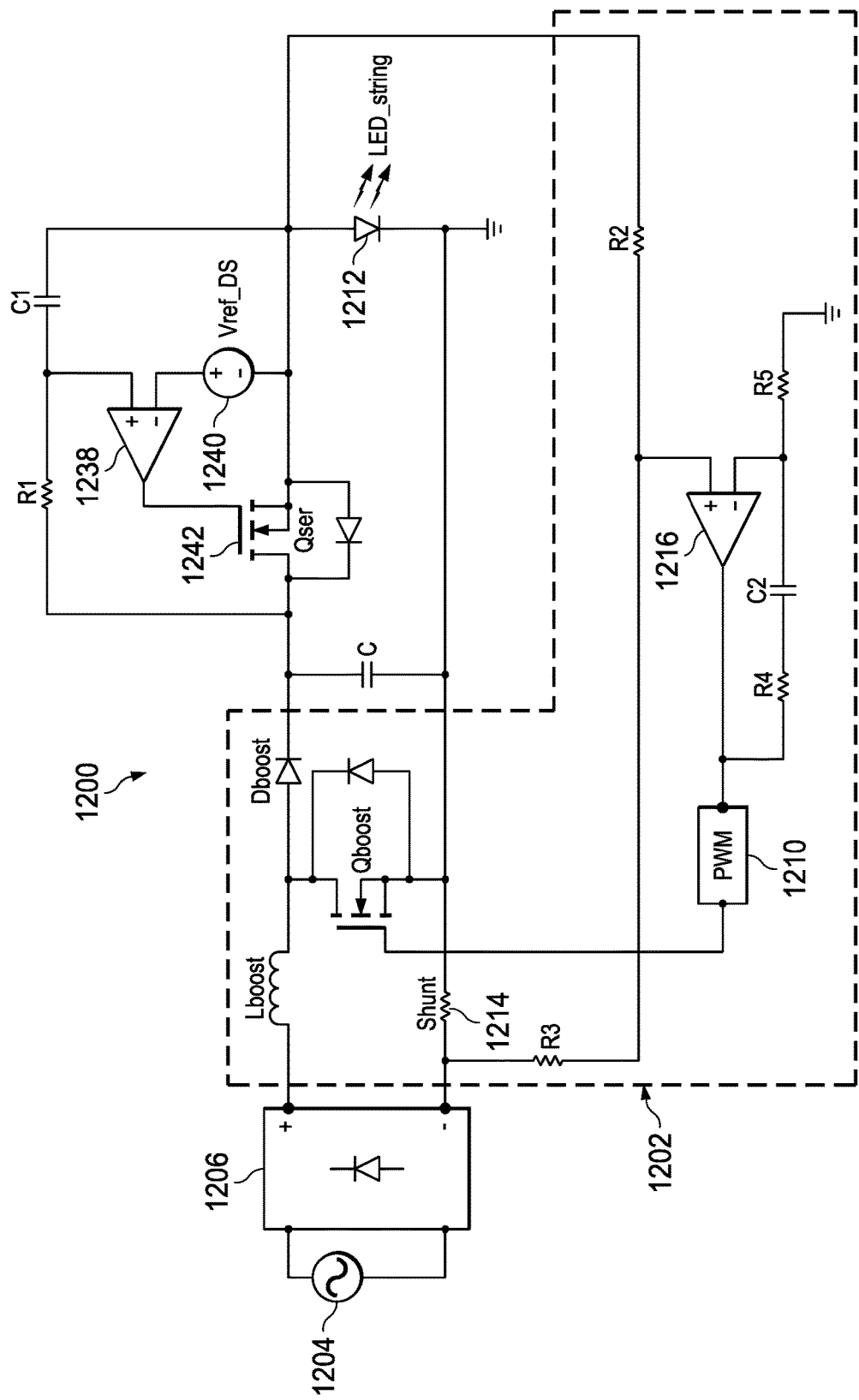
FIG. 12 is a schematic diagram of the circuit of FIG. 11.

FIG. 12 shows a practical implementation for the circuit shown in FIG. 11. In FIG. 12, the voltage source 1204 is an AC voltage source which is coupled to the voltage to current converter 1202 via full wave bridge rectifier 1206. The voltage to current converter 1202 is similar to that shown in FIG. 8. The output voltage is generated across the capacitor C. The LED string 1212 or DC to AC converter operating an AC load, such as a flourescent tube, for example, is in parallel with the capacitor C. A controlled DC current source circuit comprising resistors R1, capacitor C1, error amplifier 1238 and reference source 1240 controls an NMOS transistor 1242 in series between the capacitor C and the LED string 1212. The capacitor C1 is coupled between the capacitor C and the LED string 1212. The resistor R1, and a capacitor C1 form a low pass filter which generates a signal equal to the average voltage across the series transistor 1242. Converter 1202 also comprises a current sensor 1214, here shown as a shunt, resistors R2, R3, R4, R5 and capacitor C2. An error amplifier 1216 has its noninverting input coupled to the junction of resistors R2, R3 which is connected to the shunt 1214. The inverting input of a amplifier 1216 is connected to ground through resistor R5 and to its output to resistor R4 and capacitor C2. The output of error amplifier 1216 is coupled to pulse width modulator circuit 1210 which modulates the converter so that the input current is always a constant. The resistors R2, R3, divide down the output voltage and compare it against the voltage developed across shunt 1214. The operation of the regulator will be controlled so the input current is a fraction of the output voltage.

Figure 13:
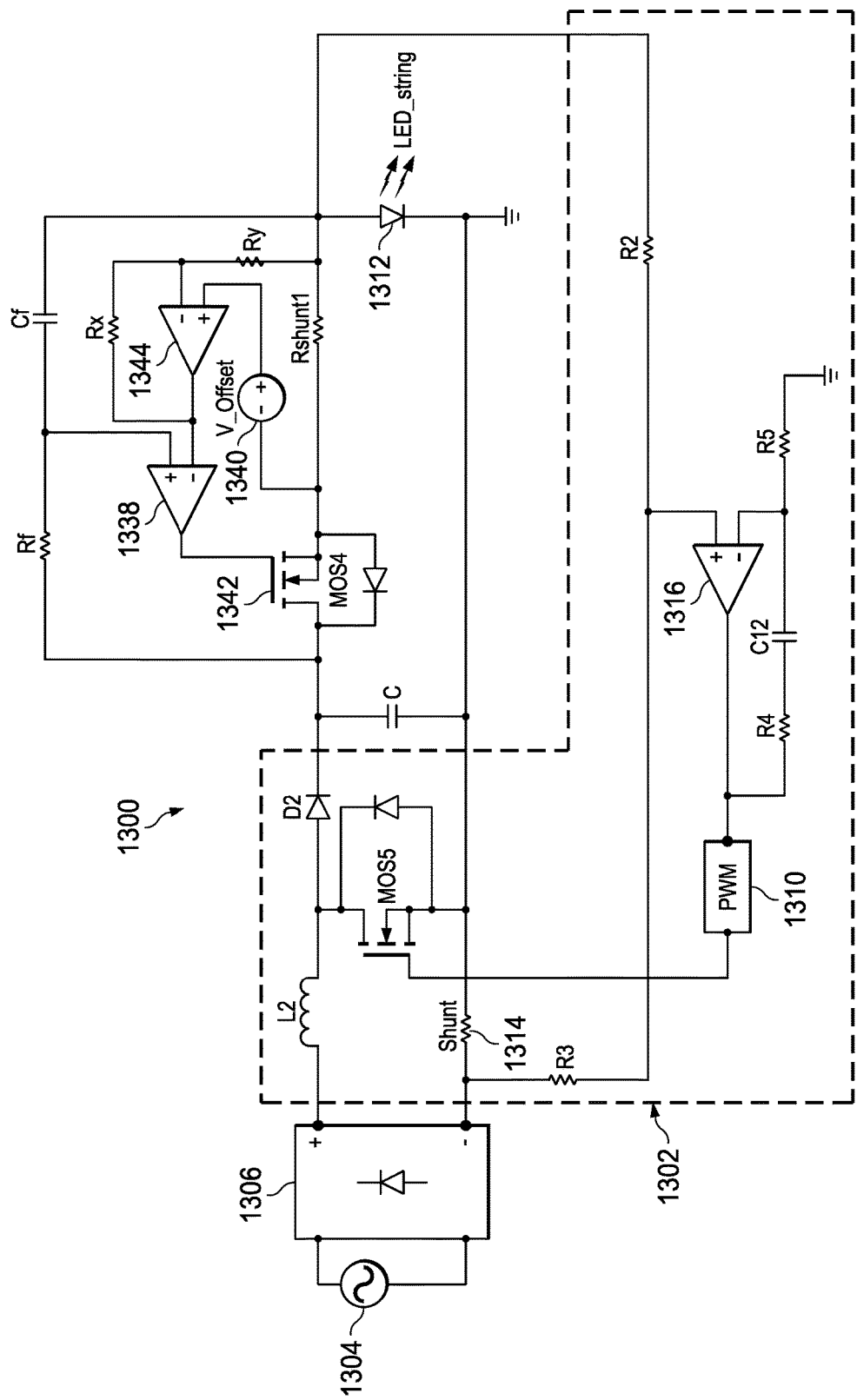
FIG. 13 is a schematic diagram of another embodiment of the present invention.

FIG. 13 shows an improved circuit over the circuit 1200 in FIG. 12 generally as 1300. An AC voltage source 1304 is coupled to a full wave bridge rectifier 1306 which is coupled to a voltage to current converter 1302. The voltage to current converter 1302 is identical to that shown in FIG. 12. A capacitor C is placed across the output of converter 1302. An NMOS transistor 1342 is coupled between the capacitor C and the LED string 1312 which is placed across the output voltage the converter. A resistor Rshunt1 is in series with transistor 1342 and the LED string 1312. Resistor Rshunt1 is coupled to the noninverting input of op amp 1344 via offset reference 1340. The inverting input of an error amplifier 1344 is connected to the output voltage across the LED string or DC to AC converter operating an AC load, such as a flourescent tube, for example, via resistor Ry. A feedback resistor Rx is connected between the inverting input of amplifier 1344 and the output thereof. A low pass filter comprising resistor Rf and capacitor Cf is placed between the voltage across the capacitor C and the voltage across the LED string 1312. The node between the resistor and the capacitor is connected to the noninverting input of error amplifier 1338, the inverting input of which is connected to the output of op amp 1344. The output of error amplifier 1338 controls the gate of transistor 1342.

In the circuit of FIG. 12, the voltage drop across the transistor 1242 is controlled by a fixed voltage reference source 1240. The ripple voltage is dependent upon the current. If the voltage is reduced, such as when the LEDs are dimmed, the ripple voltage will be less. In the embodiment shown in FIG. 12, the voltage drop is maintained at a constant by the reference voltage source 1240 resulting in excess voltage which must be dissapated by the controlled DC current source. In the embodiment shown in FIG. 13, the controlled DC current source circuit generates its own variable reference voltage, which is proportional to the current through the LEDs, so no fixed references are involved. Thus, in the circuit of FIG. 13 reference voltage sources are eliminated and excessive voltage across the controlled DC current source at lighter loads is eliminated.

Although the invention has been described in detail, it should be understood that various changes, substitutions and alterations may be made thereto without departing from the spirit and scope of the invention as defined by the appended claims. For example, the present invention is not limited to a specific converter's topology or input current control algorithm and any converter topology or algorithm for controlling the input current the converter may be utilized. In addition, although the load shown in the present application are LEDs, although loads may be driven by the present technique, such as batteries, which are charged at constant current. The controlled DC current source of the present application can be utilized separately with other converter implementations.

The invention claimed is:

1. A device, comprising:
    a DC input configured to receive a DC input voltage;
    a DC output configured to deliver a DC output voltage;
    a current sensor for measuring a DC input current and generating a current signal related to the DC input current;
    a comparator circuit for comparing a reference signal derived from a DC output voltage with the current signal to generate a comparison signal;
    a control circuit coupled to the comparator circuit, and responsive to the comparison signal, the control circuit is configured to regulate an output current to be directly proportional to a DC input voltage and independent of the DC output voltage.

2. The device of claim 1, wherein the comparator circuit includes an error amplifier having a non-inverting input coupled to receive the reference signal, an inverting input coupled to receive the current signal, and an output coupled to the control circuit.

3. The device of claim 1, wherein the control circuit is configured to regulate the DC input current according to a constant reference value.

4. The device of claim 1, wherein the control circuit is configured to regulate the DC input current to be proportional to the DC output voltage.

5. The device of claim 1, further comprising:
    a DC-to-DC converter having a first terminal coupled to the DC input, and a second terminal coupled to the DC output,
    wherein the current sensor is coupled to the first terminal of the DC-to-DC converter.

6. The device of claim 5, wherein the control circuit includes a pulse width modulation (PWM) circuit having an input coupled to receive the comparison signal, and an output coupled to the DC-to-DC converter.

7. The device of claim 5, further comprising an LED string coupled to the DC output.

8. A method comprising:
    measuring, by a current sensor, a DC input current to an LED driver circuit;
    generating, by the current sensor, a current signal related to the input current;
    comparing, by an amplifier, a reference signal derived from a DC output voltage of the LED driver circuit with the current signal to generate a comparison signal;

regulating, by a control circuit based on the comparison signal, an LED current to be directly proportional to the input voltage.

9. The method of claim 8, wherein the reference signal includes a fixed reference voltage.

10. The method of claim 8, wherein the reference signal includes a voltage feedback from the DC output voltage.

11. The method of claim 8, wherein the LED current is conducted by an LED coupled to the LED driver circuit and receiving the DC output voltage.

12. The method of claim 8, wherein the LED current is independent of the DC output voltage.

13. The method of claim 8, wherein the regulating includes regulating, by the control circuit based on the comparison signal, the DC input current to be proportional to the DC output voltage.

14. A device, comprising:
an input configured to receive an input voltage;
an output configured to deliver an output voltage;
a power converter having a first terminal coupled to the input, a second terminal coupled to the output, and a third terminal;
a current sensor configured to generate a first signal based on an input current sensed between the input and the first terminal;
an amplifier having an inverting input coupled to receive the first signal, a non-inverting input coupled to receive a second signal indicative of the output voltage, and an amplifier output; and
a pulse width modulation (PWM) circuit having a control input coupled to the amplifier output, and a PWM output coupled to the third terminal of the power converter.

15. The device of claim 14, wherein the PWM circuit is configured to regulate the power converter, based on a comparison signal received from the amplifier output, for delivering to the output an output current that is directly proportional to the input voltage.

16. The device of claim 15, wherein the output current is independent of the output voltage.

17. The device of claim 15, wherein the PWM circuit is configured to regulate the power converter, based on a comparison signal received from the amplifier output, for generating the input current that is directly proportional to the output voltage.

* * * * *